United States Patent [19]

Thompson

[11] 4,272,271
[45] Jun. 9, 1981

[54] APPARATUS FOR PRODUCTION OF MINERAL FIBERS

[75] Inventor: Thomas K. Thompson, Granville, Ohio

[73] Assignee: Owens-Corning Fiberglas Corporation, Toledo, Ohio

[21] Appl. No.: 61,572

[22] Filed: Jul. 30, 1979

[51] Int. Cl.³ .............................................. C03B 37/02
[52] U.S. Cl. ................................................ 65/1; 13/6; 65/11 R; 65/11 W; 65/DIG. 4
[58] Field of Search .................... 65/1, 11 R, DIG. 4, 65/11 W; 13/6

[56] References Cited

U.S. PATENT DOCUMENTS

| | | | |
|---|---|---|---|
| 3,511,916 | 5/1970 | Sinclair et al. | 65/1 X |
| 3,512,948 | 5/1970 | Glaser et al. | 65/1 X |
| 3,920,429 | 11/1975 | Stalego | 65/1 |
| 4,043,778 | 8/1977 | Harris | 65/1 |

FOREIGN PATENT DOCUMENTS 635054 11/1978 U.S.S.R. ......................................... 65/1

Primary Examiner—Robert L. Lindsay, Jr.
Attorney, Agent, or Firm—Ronald C. Hudgens; Philip R. Cloutier; Kenneth H. Wetmore

[57] ABSTRACT

The present invention embraces apparatus for the production of mineral fibers. An electrically heated bushing for the maufacture of glass fiber comprises an electrically conductive bottom wall having orifices for the passage of streams of molten glass therethrough for attenuation into fibers and upwardly extending, electrically conductive, sidewalls. Each sidewall has an outwardly extending, electrically conductive flange. The bushing further comprises an electrically conductive material added to a portion of each flange to lower the electrical resistance of said portion to establish desired electrical current flow distribution in the bottom wall.

6 Claims, 6 Drawing Figures

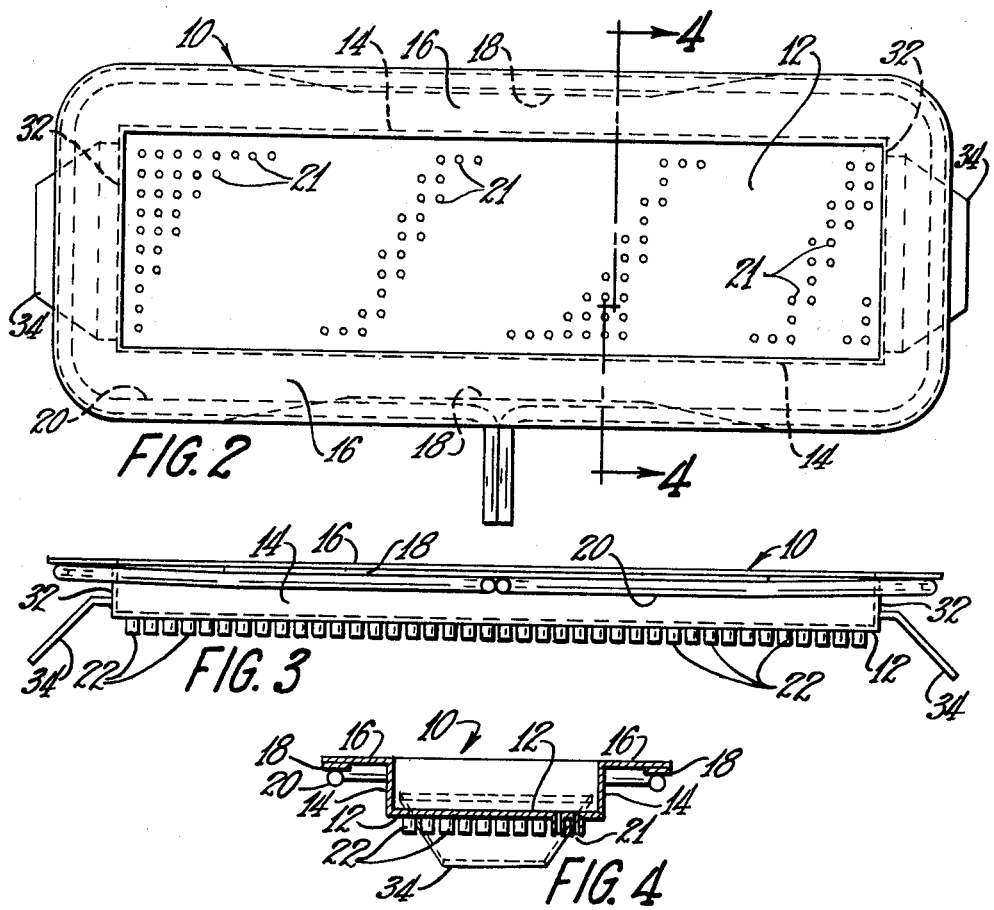

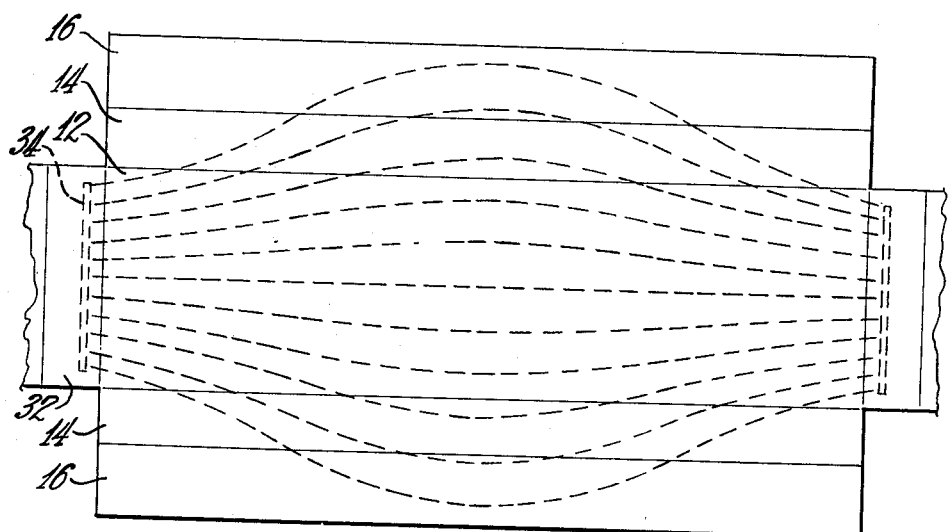
PRIOR ART  FIG. 5
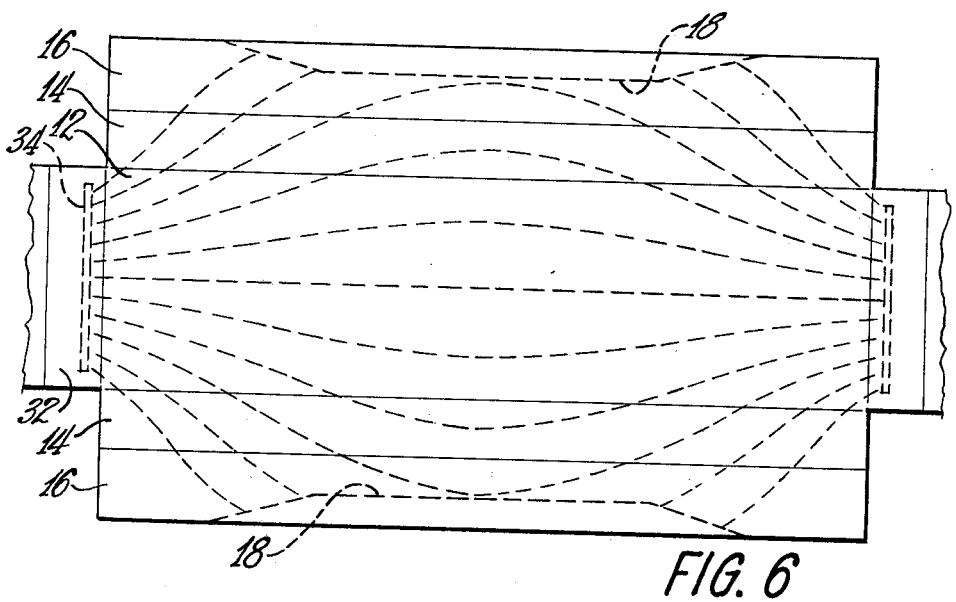
FIG. 6

APPARATUS FOR PRODUCTION OF MINERAL FIBERS

TECHNICAL FIELD

The invention relates to apparatus for producing fibers from heat softened mineral material, such as glass. More specifically, this invention relates to means of establishing desired current flow patterns or distribution within a fiber forming bushing to improve the heat uniformity within the bushing body. The current patterns within a bushing are established by the resistance of the various parts of the bushing, that is, the orifice plate, sidewalls, etc.

BACKGROUND ART

It has been conventional practice to produce mineral fibers, and particularly glass fibers, through electrically heated bushings. It is necessary to distribute the heat pattern of the bottom wall of the bushing as uniformly as possible for a successful fiber forming operation. Controlling the electrical flow through the bushing to control the heat pattern has generally been done by varying the size of the end walls of the bushing and by the configuration and location of the electrical terminals. Such bushing arrangements produce within the bushings current paths which basically travel through the base plate initially and then spread into the sidewalls to produce a heat pattern with higher temperatures in the center end region of the bushing near the terminal and lower temperatures in corners of the bottom wall. With the advent of larger bushings, and particularly wider bushings, it has become progressively difficult to supply sufficient heat to the corner regions of the bushing and to maintain a desired temperature in the central region of the bottom wall.

SUMMARY OF THE INVENTION

The present invention comprises an electrically heated bushing for the manufacture of glass fibers comprising an electrically conductive bottom wall having orifices for the passage of streams of molten glass therethrough for attenuation into fibers, upwardly extending electrically conductive sidewalls, each sidewall having an outwardly extending, electrically conductive flange, and an electrically conductive material added to a portion of each flange to lower the electrical resistance of said portion to establish a desired electrical current flow distribution in the bottom wall.

The present invention comprises apparatus for the production of mineral fibers. Such apparatus comprises an electrically heated bushing comprising a bottom wall having orifices for the supply of streams of molten mineral material, upwardly extending end walls having electrical terminals extending therefrom and upwardly extending sidewalls having outwardly extending flanges, electrically conductive material added to the flanges to establish the electical current flow through the flanges to control the heat pattern of the bottom wall and means for attenuating the streams of molten mineral material into fibers.

An object of the invention is an improved apparatus for the production of mineral fibers.

Another object of the invention is to provide an improved bushing for use in the manufacturer of mineral fibers, such as glass fibers.

These and other objects of the invention will become more apparent as the invention is described hereinafter in detail with reference to the accompanying drawings.

DESCRIPTION OF THE DRAWINGS

FIG. 2 is.a top plan view of the bushing construction of the invention.

FIG. 3 is a side view of the bushing assembly of the invention.

FIG. 4 is a sectional view taken substantially on the line 4—4 of FIG. 2.

FIG. 5 is a schematic view of the prior art current distribution through a conventional bushing.

FIG. 6 is a schematic view of the current distribution through a bushing of the present invention.

DESCRIPTION OF THE PREFERRED EMBODIMENTS

Figure 1:
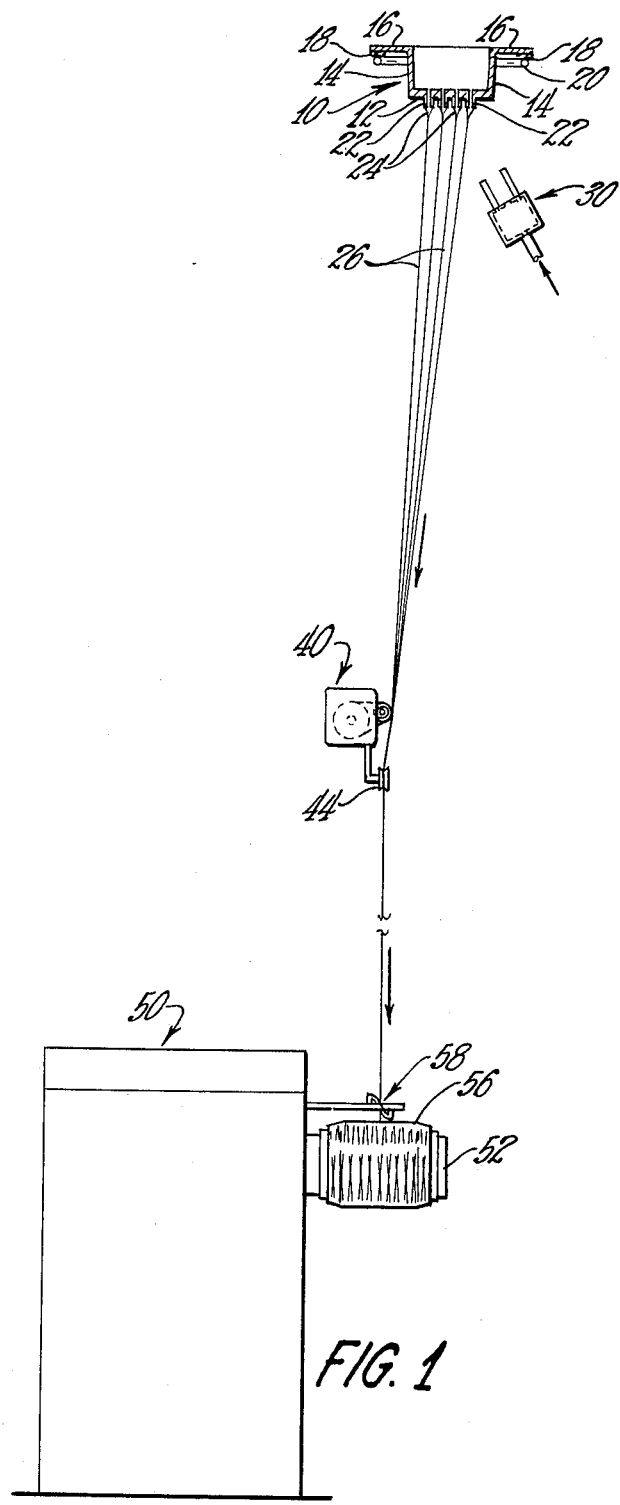
FIG. 1 is a semi-schematic elevational view of a fiber forming apparatus embodying the invention.

Before explaining the present invention in detail, it is to be understood that the invention is not limited in application to the details of construction and arrangement of the parts illustrated in the accompanying drawings, since the invention is capable of other embodiments and of being practiced or carried out in various ways to produce elements for other end uses. Also, it is to be understood that the phraseology employed herein is for the purpose of description and not of limitation.

While the apparatus of the invention has particular utility in the processing of glass for forming fibers or filaments, it is to be understood that the apparatus may be employed for producing fibers from other materials.

Referring to the drawings in detail, FIG. 1 illustrates a fiber forming operation. Mineral material, such as glass, is maintained in a molten condition in bushing or stream feeder assembly 10 from which a plurality of streams of material is emitted from orificed tips or projections 22 depending from the bushing floor. Bushings which do not have but tips have an orificed bottom wall can also be used. The streams of glass form cones 24 at the discharge end of the orificed projections. Glass fibers 26 are attenuated from the cones of molten glass. The fibers are coated by size applicator 40 and gathered into a strand by gathering shoe 44. The strand is then collected by winder assembly 50. The strand is reciprocated by traverse 58 for collection on the winder collect 52.

To control the glass fiber forming environment, blower means 30 is provided. It is also within the scope of the present inventon to use conventional fin shield glass fiber forming environment control apparatus rather than the blower apparatus shown.

The bushing assembly of FIG. 1 is shown in greater detail in FIGS. 2 through 4. The bushing chamber comprises a bottom wall 12, upwardly extending end walls 32 and upwardly extending sidewalls 14. The end walls have electrical terminals 34 extending therefrom. The sidewalls each have an outwardly extending flange 16 at the upper edge thereof. The bushing bottom wall, end walls, sidewalls, and flanges are constructed of an electically conductive metal such as a platinum/rhodium alloy.

The bushing is provided with means for establishing a desired electrical current flow pattern through the flange to establish the electrical current flow pattern of the bottom wall and sidewalls. As shown, the addition of material to the flange modifies the current flow distribution such that relatively more current flows through the corner regions and relatively less current flows through the central region of the bottom wall. By such modification the heat pattern of the bottom wall is controlled to that desired.

FIG. 2 shows electrically conductive material 18 that has been added to only a portion of each flange 16 to lower the electrical resistance of said portion. In this embodiment, the material is added only to the outer area of each flange along the central region of the length of said flange. The shape of the ends of the material is designed to avoid hot spots. A tapered shape as shown can be used. As can be seen in FIG. 4, the material 18 is positioned on the bottom surface of the flange although it could be on the upper surface or made an integral part thereof.

Adjacent the bottom surface of the material and the flange is cooling means 20. As shown, the cooling means can be a water cooled tube which conveys excess heat away from the outer edges of the flange to prevent glass from leaking from the bushing during operation.

Because of the increased flow of current through the flange with the added material, it is necessary to supply slightly more current to this bushing than to a prior art bushing to maintain generally the same bottom plate temperature. This additional current can result in excess heating of the flange, and in particular, of the material added to the flange. The cooling means removes any excess heat from the flange and material so that such heat does not adversely affect the bottom wall heat pattern by conduction of heat from the flange and material through the refractory material surrounding the bushing to the sidewalls and bottom wall.

FIG. 5 illustrates an electrical current flow pattern in a prior art bushing. The current flows from terminal 34 of end wall 32 through bottom wall 12, sidewalls 14 and flanges 16 to the terminal at the other end of the bushing. The current flow in the corner region of the prior art bushing bottom wall and in the end regions of the sidewalls at the end wall region is small. Since the current flow is small, the heat generated in these areas will also be less than that in other areas of the bushing. This can result in cooler areas in the bushing, and thus, poor bushing performance. Cooler areas in a bushing can also result in production interruptions.

FIG. 6 illustrates an electrical current flow pattern in a bushing resulting from use of the present invention. The current flows from terminal 34 of end wall 32 through bottom wall 12, sidewalls 14 and flanges 16 to the terminal at the other end wall of the bushing. The current flow illustrated in FIG. 6 is quite different from that shown in FIG. 5. This difference in current flow is due to the conductive material 18 added to a portion of each side wall flange. Material 18 reduces the electrical resistance at the center portion of the outside of the flange, and thus, additional current flows from the terminal through the corner regions of the bottom wall and the end regions of the sidewalls. This increased current flow results in improved bushing heat patterns.

Specific design dimensions of the material will depend upon the size and shape of the particular bushing. For example, the height of the sidewalls, the length and width of the flanges and the thickness of various portions of the bushings must be considered when specifying the material to be added to the flange. It is, of course, within the scope of the invention that the material can be added as an integral part of the flange during construction of the bushing.

The following is a specific example of a bushing according to the invention. The bushing is generally of the same configuration as shown in FIGS. 1-4. The flange along the length of the bushing is about 43 centimeters in length and about 3 centimeters in width. The sidewalls and flanges are both about 0.05 centimeters in thickness. The material added to the center, outside region of the bottom of the flange is shaped as shown in FIG. 2. The ends of the material are tapered to avoid hot spots during operation. The material is about 30 centimeters in length at its longest portion and about 18 centimeters in length at its shortest portion. The material is about 1 centimeter in width and has a thickness of about 0.06 centimeter. With such a construction the bushing has an electrical current flow distribution is shown in FIG. 6.

It should be noted that the added material does not extend the length of the flange. If the material extended the length of the flange, or if the flange were merely widened, or if the flange were merely thickened uniformly, the current flow pattern would not be as shown in FIG. 6.

Having described the invention in detail, it will be understood that such specifications are given for the sake of explanation. Various modifications and substitutions other than those cited may be made without departing from the scope of the invention as defined in the following claims.

INDUSTRIAL APPLICABILITY

The present invention would be useful in the mineral fiber forming art and, in particular, in the glass fiber forming art.

I claim:
1. An electrically heated bushing for the manufacturer of glass fibers comprising:
 a. an electrically conductive bottom wall having orifices for the passage of streams of molten glass therethrough for attenuation into fibers;
 b. upwardly extending, electrically conductive, sidewalls, each sidewall having an outwardly extending, electrically conductive flange; and
 c. an electrically conductive material added to a portion of each flange to lower the electrical resistance of said portion to establish a desired electrical current flow distribution in the bottom wall, the material generally not extending along the entire length of the flange such that more of the material is in the central region of the flange length then in the end regions of the flange length.

2. The bushing of claim 1 wherein the material is added to the outer area of each flange along the central region of the length of said flange.

3. The bushing of claim 2 wherein the material is added to the bottom surface of each flange.

4. The bushing of claim 1 comprising a cooling means for removing excess heat from each flange.

5. A resistance heated bushing for supply of molten mineral material in the form of streams to be attenuated into fibers, wherein the bushing comprises a chamber formed by metallic sidewalls, end walls, and a bottom, said sidewalls having outwardly extending, generally horizontal flanges at upper edges thereof, the improvement comprising:
 a. electrically conductive material added to the flange to modify the electrical resistance of a portion of the flanges to establish a desired electrical flow distribution within the bushing the material extending along less than the entire length of the flange.

6. Apparatus for the production of mineral fibers comprising:

a. an electrically heated bushing comprising a bottom wall having orifices for the supply of streams of molten mineral material, upwardly extending end walls having electrical terminals extending therefrom and upwardly extending sidewalls having outwardly extending flanges;

b. electrically conductive material added to the flanges to establish the electrical current flow pattern through the flanges to control the heat pattern of the bottom wall wherein more of the material is positioned along the central region of the length of the flange than along the end regions of the flange; and c. means for attenuating the streams of molten mineral material into fibers.

* * * * *

UNITED STATES PATENT AND TRADEMARK OFFICE
CERTIFICATE OF CORRECTION

PATENT NO. : 4,272,271
DATED : June 9, 1981
INVENTOR(S) : Thomas K. Thompson

It is certified that error appears in the above—identified patent and that said Letters Patent is hereby corrected as shown below:

Column 2, line 47 should read:

cated by traverse 58 for collection on the winder collet

Column 4, line 15 should read:

bushing has an electrical current flow distribution as

Signed and Sealed this

Twenty-fifth Day of August 1981

[SEAL]

Attest:

Attesting Officer

GERALD J. MOSSINGHOFF

Commissioner of Patents and Trademarks